(12) United States Patent
Farmer et al.

(10) Patent No.: US 8,356,102 B2
(45) Date of Patent: Jan. 15, 2013

(54) SELECTIVE CONNECTION BETWEEN CORRESPONDING COMMUNICATION COMPONENTS INVOLVED IN A TELECONFERENCE

(75) Inventors: Ryan Farmer, Redmond, WA (US); Jayendran Srinivasan, Sammamish, WA (US); Alan L. Bridgewater, Bothell, WA (US); Shi Lu, Kirkland, WA (US); William A. Ridmann, Seattle, WA (US); Shruti Kasetty, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 381 days.

(21) Appl. No.: 12/703,472

(22) Filed: Feb. 10, 2010

(65) Prior Publication Data

US 2011/0196972 A1 Aug. 11, 2011

(51) Int. Cl.
*G06F 15/16* (2006.01)
(52) U.S. Cl. ........................................ 709/228; 709/206
(58) Field of Classification Search .................... 709/231
See application file for complete search history.

(56) References Cited

U.S. PATENT DOCUMENTS

| | | | | |
|---|---|---|---|---|
| 6,738,356 B1 * | 5/2004 | Russell et al. | | 370/260 |
| 7,363,361 B2 | 4/2008 | Tewari | | |
| 7,672,255 B2 * | 3/2010 | Lin | | 370/260 |
| 7,925,771 B1 * | 4/2011 | Ping et al. | | 709/231 |
| 2002/0133611 A1 * | 9/2002 | Gorsuch et al. | | 709/231 |
| 2004/0161080 A1 | 8/2004 | Digate | | |
| 2004/0199643 A1 | 10/2004 | Thompson | | |
| 2005/0021806 A1 * | 1/2005 | Richardson et al. | | 709/231 |
| 2006/0080432 A1 | 4/2006 | Spataro | | |
| 2006/0101022 A1 | 5/2006 | Yu | | |
| 2007/0091907 A1 * | 4/2007 | Seshadri et al. | | 370/401 |
| 2007/0121580 A1 * | 5/2007 | Forte et al. | | 370/351 |
| 2007/0130255 A1 | 6/2007 | Wolovitz | | |
| 2009/0055539 A1 | 2/2009 | Fukui | | |
| 2009/0157608 A1 | 6/2009 | Strathearn | | |
| 2010/0005178 A1 * | 1/2010 | Sindelaru et al. | | 709/228 |

OTHER PUBLICATIONS

Shafiq et al., "Access Control Management in a Distributed Environment Supporting Dynamic Collaboration," DIM '05, Nov. 11, 2005, Copyright © 2005, pp. 104-112.

* cited by examiner

*Primary Examiner* — Aaron Strange
*Assistant Examiner* — Keyvan Emdadi
(74) *Attorney, Agent, or Firm* — Merchant & Gould

(57) ABSTRACT

A client device selectively establishes connections between selected client communication components and corresponding server communication components. The client device receives data from the corresponding server communication components via the connections between the selected client communication components and the server communication components. The data received via different ones of the connections is associated with a different content stream of a teleconference. During the teleconference, a given connection is suspended. When the given connection is suspended, the client computing device continues to receive data via connections other than the given connection.

17 Claims, 10 Drawing Sheets

SELECTIVE CONNECTION BETWEEN CORRESPONDING COMMUNICATION COMPONENTS INVOLVED IN A TELECONFERENCE

BACKGROUND

In today's globalized economy, communication between geographically distant people has become increasingly important. Moreover, as communication among distant people has become more important, the number of ways in which such people need to communication has grown. For example, it is frequently no longer sufficient to merely be able to talk to distant people in a teleconference. Rather, effective communication can require multiple content streams within a single teleconference. For example, effective communication can require the ability to exchange video, share applications, show slideshow presentations, write on virtual whiteboards, exchange instant messages, and exchange information in other ways within a single teleconference.

Supporting multiple content streams within a teleconference can be resource intensive for both a server system that distributes data associated with the content streams and client devices that receive data associated with the content streams. For example, the server system may not have sufficient bandwidth to push out a sufficient amount of data to provide a satisfactory quality of service to the client devices. Similarly, client devices may not have sufficient bandwidth to receive a sufficient amount of data to provide a satisfactory quality of service. In another example, the server system and the client devices can maintain connections for each of the content streams in a teleconference. Maintenance of such connections consumes memory space, cache space, and processor cycles. Furthermore, receiving and processing data from each of these content streams can tax the resources of client devices.

SUMMARY

This summary is provided to introduce a selection of concepts. These concepts are further described below in the Detailed Description. This summary is not intended to identify key features or essential features of the claimed subject matter, nor is this summary intended as an aid in determining the scope of the claimed subject matter.

In one aspect, a method comprises instantiating, by a client device, a plurality of client communication components. Each client content component in the plurality of client communication components corresponds to one server content component in a plurality of server communication components at a server system. The method further comprises selectively establishing connections between target server communication components in the plurality of server communication components and corresponding client communication components in the plurality of client communication components. In addition, the method comprises receiving, by the client device, data from the target communication components via the connections. The data from different ones of the target communication components is associated with a different content stream of a teleconference. In addition, the method comprises, during the teleconference, suspending a given connection. The given connection is the connection between a given client communication component in the plurality of client communication components and a given server communication component in the plurality of server communication components. The given server communication component corresponds to the given client communication component, the client device continuing to receive data via the connections other than the given connection.

In another aspect, a server system comprises a processing system. The server system also comprises a data storage system that stores instructions that, when executed by the processing system, cause the server system to instantiate a hierarchy of server communication components. The hierarchy of server communication components includes at least a first server content component and a second server content component. In addition, the instructions, when executed by the processing system, cause the server system to establish a first connection. The first connection is between the first server content component and a first client content component on a client device. The instructions, when executed by the processing system, also cause the server system to establish a second connection. The second connection is between the second server content component and a second client content component on the client device. Furthermore, the instructions, when executed by the processing system, cause the server system to send data associated with a first content stream of a teleconference to the first client content component via the first connection. In addition, the instructions, when executed by the processing system, cause the server system to send data associated with a second content stream of the teleconference to the second client content component via the second connection. Furthermore, the instructions, when executed by the processing system, cause the server system to during the teleconference, suspend the first connection without suspending the second connection.

In another aspect, a computer-readable data storage medium comprises instructions that, when executed by a processing system of a client device, cause the client device to send a request to a server system to be involved in a teleconference having a plurality of content streams. Each content stream in the plurality of the content streams belongs to one of the following types of content streams: slideshow presentations, real time audio communication streams, whiteboards, text chat, polls and surveys, screen sharing, desktop sharing, and application sharing. The instructions, when executed by the processing system, further cause the client device to receive root child data from the server system. The root child data identifies a server content manager component at the server system. The instructions, when executed by the processing system, further cause the client device to instantiate, in response to receiving the root child data, a client content manager component. In addition, the instructions, when executed by the processing system, cause the client device to establish a connection. The connection is between the client content manager component and the server content manager component. The instructions, when executed by the processing system, further cause the client device to receive content manager child data via the connection. The content manager child data identifies a plurality of server communication components. Each server communication component in the plurality of server communication components is a child of the server content manager component. The instructions, when executed by the processing system, further cause the client device to instantiate a plurality of client communication components. The client communication components are child components of the client content manager component. Each of the client communication components corresponds to one of the server communication components. The instructions, when executed by the processing system, further cause the client device to identify target communication components from among the plurality of server communication components. The instructions, when executed by the processing system, further cause the client device to selectively establish additional connections. The additional connections are between the target communication components and corresponding client content components in the plurality of client communication components. The instructions, when executed by the processing system, further cause the client device to receive data from the target communication components via the additional connections. The data received via different ones of the additional connections are associated with different ones of the content streams. The instructions, when executed by the processing system, further cause the client device to process the data received via the additional connections to present the content streams. During the teleconference, the instructions, when executed by the processing system, cause the client device to suspend a given connection. The given connection is one of the additional connections. The client device continues to receive data via the additional connections other than the given connection. Furthermore, during the teleconference, the instructions, when executed by the processing system, cause the client device to resume the given connection. After resuming the given connection, the instructions, when executed by the processing system, cause the client device to terminate the teleconference.

DETAILED DESCRIPTION

Figure 1:
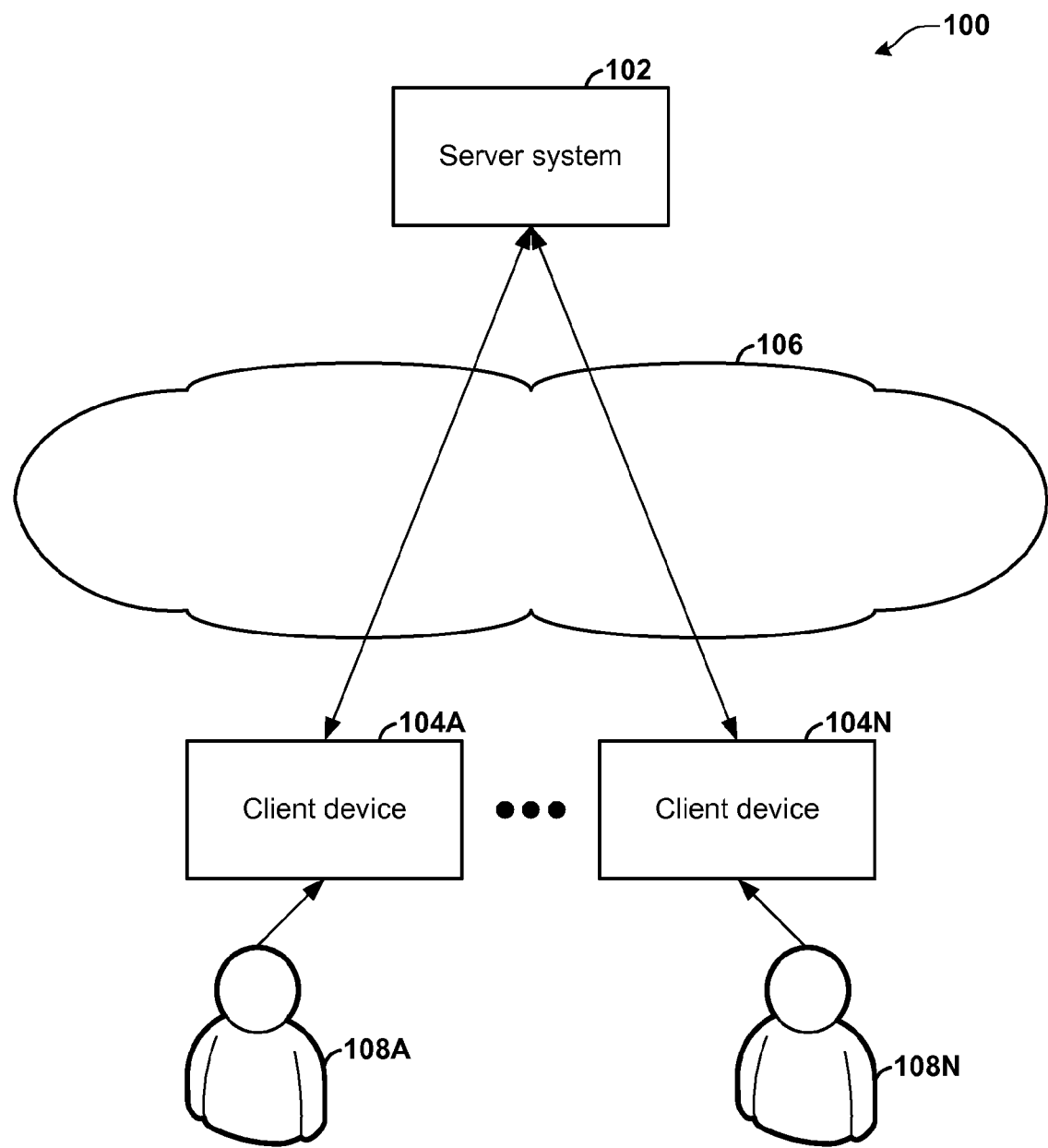
FIG. 1 illustrates an example communication system.

FIG. 1 illustrates an example communication system 100. As illustrated in the example of FIG. 1, the communication system 100 includes a server system 102, client devices 104A-104N (collectively, "client devices 104"), and a network 106.

The server system 102 is a system comprising one or more computing devices. The client devices 104 are computing devices. A computing device is a physical device that processes information. Example types of computing devices include personal computers, laptop computers, standalone server computers, blade server computers, supercomputers, mainframe computers, handheld computers, mobile telephones, network telephones, personal media players, video game consoles, point-of-sale computers, television set top boxes, network-connected televisions, computers integrated into vehicles, intermediate network devices, and other types of physical devices that process information. The server system 102 can comprise one or more of these and/or other types of computing devices. Similarly, the client devices 104 can belong to these or other types of computing devices.

Computing devices, such as the client devices 104 and those in the server system 102, perform particular actions when processing systems in the computing devices execute instructions. As used herein, a processing system is a set of one or more integrated circuits that operates to selectively execute instructions. In some embodiments, such instructions are stored in data storage systems. As used herein, a data storage system is a set of one or more computer-readable data storage media. A computer-readable data storage medium is a physical device or article of manufacture that is capable of storing data and instructions in such a way that a computing device can read the data and instructions. In some instances, such computer-readable data storage media are parts of computer program products. In other embodiments, computing devices receive the instructions via a communication medium, such as a wired or wireless network connection. Furthermore, in some embodiments, application specific integrated circuits (ASICs) or field-programmable gate arrays (FPGAs) cause computing devices, such as the client devices 104 and those in the server system 102, to perform particular actions.

The network 106 is a collection of computing devices and links that facilitate communication among the client devices 104 and the server system 102. In various embodiments, the network 106 includes various types of computing devices. For example, the network 106 can include routers, switches, mobile access points, bridges, hubs, intrusion detection devices, storage devices, standalone server devices, blade server devices, sensors, desktop computers, firewall devices, laptop computers, handheld computers, mobile telephones, and other types of computing devices. In various embodiments, the network 106 includes various types of links. For example, the network 106 can include wired and/or wireless links. Furthermore, in various embodiments, the network 106 is implemented at various scales. For example, the network 106 can be implemented as one or more local area networks (LANs), metropolitan area networks, subnets, wide area networks (such as the Internet), or can be implemented at another scale.

Each of the client devices 104 is associated with a different user 108A-108N (collectively, "users 108"). The users 108 use the client devices 104 to participate in teleconferences facilitated by the server system 102. As used herein, a teleconference is a meeting conducted among two or more participants in different locations via telecommunications equipment. Example types of teleconferences include webinars, web conferences, webcasts, conference calls, and other types of meetings conducted among two or more participants in different locations via telecommunications equipment.

Teleconferences have one or more content streams. A content stream is a logically separate stream of human perceivable content in a teleconference. Example types of content streams include slideshow presentations, live or previously-recorded video streams, real time audio communication streams (e.g., voice telephony streams), whiteboards, text chat, polls and surveys, screen sharing, desktop sharing, application sharing, and other types of logically separate streams of human perceivable content.

A teleconference can concurrently have more than one content stream. For example, a teleconference can concurrently have an audio stream and a whiteboard. In another example, a teleconference can concurrently have a video stream and desktop sharing. Furthermore, a teleconference can concurrently have more than one content stream of the same type. For example, a teleconference can concurrently have two or more whiteboards. In this example, each of the whiteboards includes different content and can be drawn on separately. In another example, a teleconference can concurrently have two or more video streams. In this example, one of the video streams shows a panel of presenters and another video stream shows another person participating in the teleconference.

For each teleconference facilitated by the server system 102, the server system 102 instantiates a plurality of server communication components. A server communication component is a resource that transmits data associated with a teleconference. A resource is an entity that can be identified by an identifier. Example types of resources include object-oriented programming objects, modules, application programming interfaces (APIs), data sources, and so on.

In some embodiments, each of the server communication components has a common interface. In other words, each of the server communication components has a shared set of methods and attributes. In different embodiments, the common interface can have different methods and attributes. For example, in some embodiments, each of the server communication components has a constructor method, a destructor method, and a method for instructing the server communication component to suspend a connection. As used herein, a connection is a semi-permanent interactive information interchange between two nodes that is established at a certain point in time and terminated at a later point in time.

The plurality of server communication components includes one or more server content components. A server content component is a server communication component that transmits data associated with a separate content stream of a teleconference. For example, the server system 102 can instantiate a server content component that transmits content data representing a video stream. In another example, the server system 102 can instantiate a server content component that transmits metadata regarding a whiteboard, but not content data representing the content of the whiteboard. As used herein, a server communication component is associated with a content stream when the server communication component transmits data associated with the content stream. Furthermore, as used herein, data is associated with a content stream when the data relates to the content stream.

Each of the client devices 104 participating in a teleconference instantiates a separate client communication component for each server communication component involved the teleconference. A client communication component is a resource that receives and processes data associated with a teleconference. Each of the client communication components corresponds to a different one of the server communication components for the teleconference. As used herein, a client communication component corresponds to a server communication component when the client communication component is configured to receive and process data transmitted by the server communication component.

In some embodiments, each of the client communication components has a common interface. In other words, each of the client communication components has a shared set of methods and attributes. In different embodiments, the common interface can have different methods and attributes. For example, in some embodiments, each of the client communication components has a constructor method, a destructor method, a method for instructing the client communication component to establish a connection, a method for instructing the client communication component to suspend a connection, and a method for instructing the client communication component to resume a suspended connection.

The client communication components include one or more client content components. The client content components receive and process data associated with separate content streams of a teleconference. For example, a client communication component that receives and processes content data representing a video stream corresponds to a service communication component that transmits content data representing the video stream.

The client devices 104 selectively establish connections between their client communication components and corresponding server communication components. When a connection is established between a client communication component and a corresponding server communication component, the client communication component receives data transmitted by the corresponding server communication component.

During a teleconference, a connection between a client communication component and a corresponding server communication component can be suspended. While the connection is suspended, one or more other client communication components involved in the teleconference continue to receive content data via other connections. In other words, the other connections remain active. For example, the content streams of a teleconference can include a video stream and a whiteboard. In this example, the server system 102 instantiates a first server content component and a second server content component. The first server content component transmits content data representing the video stream. The second server content component transmits content data representing the whiteboard. In this example, the client communication device instantiates a first client content component corresponding to the first server content component and a second client component corresponding to the second server content component. In this example, the client device can suspend the connection between the second client content component and the second server content component. Consequently, the second client content component does not receive content data representing the whiteboard. However, the first client content component continues to receive content data representing the video stream.

Connections between corresponding communication components can be suspended by the server system 102 or the client devices 104. Furthermore, connections between corresponding communication components can be suspended for a variety of reasons. For example, a client device can suspend a connection when the client device determines that the client device does not have the processing power to effectively present content data received via the connection. In another example, a client device can suspend a connection when the client device determines that a user of the client device is not using a content stream in a teleconference. In yet another example, the server system 102 can suspend a connection when the server system 102 determines that the server system 102 is too busy to transmit data for all of the client communication components involved in a teleconference.

In some embodiments, the client devices 104 create one or more resources when the client devices 104 establish connections. These resources help to facilitate the connections. Example types of resources include sockets, event listeners, software objects, message queues, and other types of resources. In some embodiments, the client devices 104 tear down such resources when the connections facilitated by these resources are suspended. In other embodiments, the client devices 104 do not tear down such resources when the connections facilitated by these resources are suspended.

During a teleconference, a suspended connection between a client communication component and a server communication component can be restored. When the connection is restored, the server communication component resumes transmitting data to the client communication component via the connection.

Figure 2:
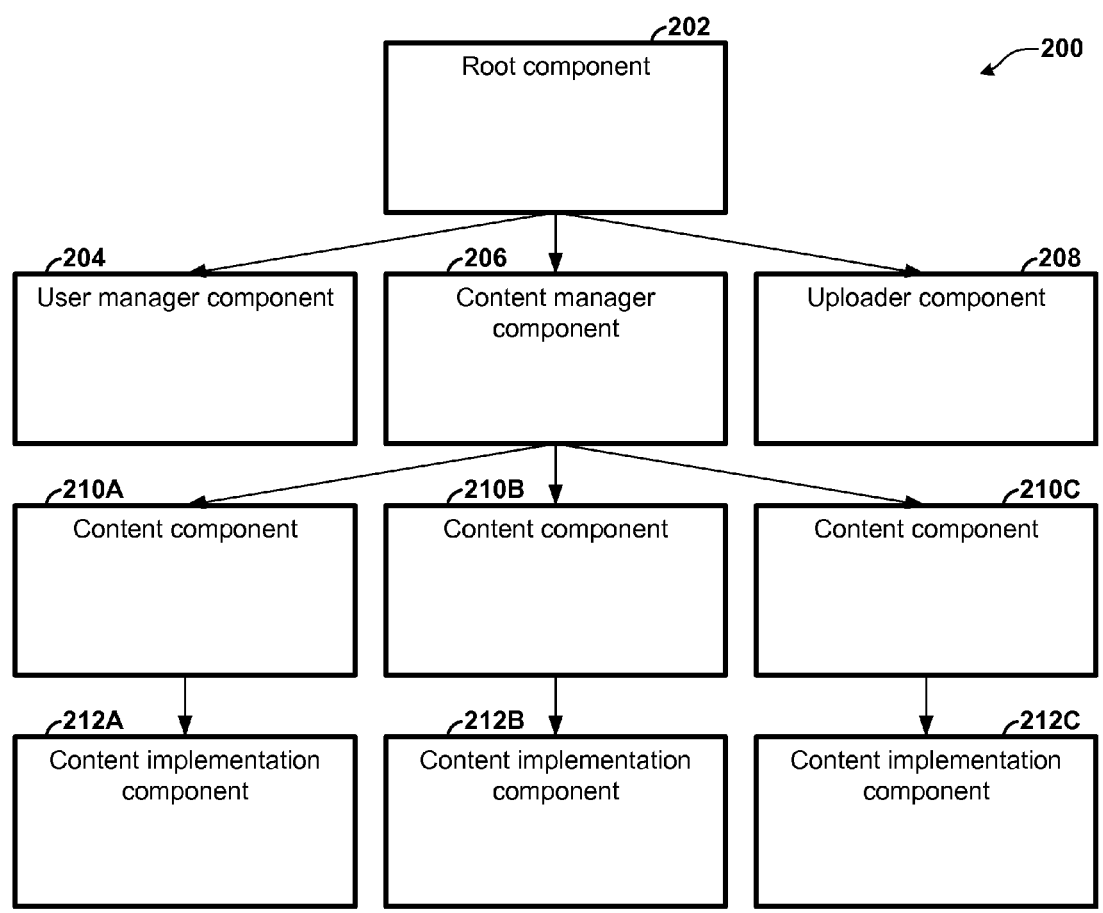
FIG. 2 is a block diagram illustrating an example hierarchy of server communication components.

FIG. 2 is a block diagram illustrating an example hierarchy 200. The hierarchy 200 comprises server communication components involved in a teleconference facilitated by the server system 102. The server system 102 instantiates each of the server components in the hierarchy 200. Each of the client devices 104 instantiates a parallel hierarchy of client communication components.

As illustrated in the example of FIG. 2, the hierarchy 200 includes a server root component 202, a server user manager component 204, a server content manager component 206, a server uploader component 208, server content components 210A-210C (collectively, "server content components 210"), and server content implementation components 212A-212C (collectively, "server content implementation components 212").

As used in this document, a first communication component is a child component of a second communication component when the second component creates, interacts with, and destroys the first communication component. The server user manager component 204, the server content manager component 206, and the server uploader component 208 are child components of the server root component 202. In other words, the server root component 202 creates, interacts with, and destroys the server user manager component 204, the server content manager component 206, and the server uploader component 208. The server content components 210 are child components of the server content manager component 206. The server content implementation components 212 are child components of respective ones of the server content components 210.

When a user of a client device wants to join a teleconference, the client device sends a request to the server system 102. The request includes an identifier of the server root component 202. When the server system 102 receives the request, the server root component 202 sends root connection data to the client device. The root connection data specifies how the client device is to set up a connection to the server root component 202. The server root component 202 also sends root child data that specifies the child components of the server root component 202 (i.e., the server user manager component 204, the server content manager component 206, and the server uploader component 208).

Each of the server content implementation components 212 processes and sends content data of an individual content stream in the teleconference. The content data represents the substantive content of the individual content stream. For example, the server content implementation component 212A can process and send content data that represents the content of a whiteboard. In another example, the server content implementation component 212B can process and send content data that represents a voice telephony stream.

Each of the server content components 210 processes and sends metadata regarding an individual content stream in the teleconference. For example, the server content component 210A can process and send metadata regarding a whiteboard or another type of content. In another example, the server content component 210B can process and send metadata regarding a voice telephony stream or another type of content.

The metadata sent by different ones of the server content components 210 can specify different types of information. Continuing the examples of previous paragraph, the metadata sent by the server content component 210A can represent a timestamp indicating a last time the content of the whiteboard was updated, a timestamp indicating a time when the whiteboard was created, a value that identifies a user who created the whiteboard, values that identify users who have edited the content of the whiteboard, a value indicating a version of the server content component 210A, and other metadata regarding the whiteboard. Furthermore, the metadata sent by the server content component 210B can represent a timestamp indicating a time when the voice telephony stream started, a value that identifies a user who initiated the voice telephony stream, values that identify users who are allowed to speak on the voice telephony stream, a timestamp indicating a last time a user spoke on the voice telephony stream, and other metadata regarding the voice telephony stream.

The server content manager component 206 is responsible for determining whether client communication components establish, suspend, or resume connections to the server content component 210A. When the server content manager component 206 determines that a given client communication component on one of the client devices 104 should establish, suspend, or resume a connection to a given one of the server content components 210, the server content manager component 206 sends data to a corresponding client content manager component on the client device. The data instructs the corresponding client content manager component to instruct the given client communication component to establish, suspend, or resume a connection to the given server content component.

The server user manager component 204 is responsible for maintaining a mapping between user identifiers and names of users participating in the teleconference. When a user contributes something to a content stream, a user identifier associated with the user can be added to the content stream. For example, when a user draws something on a whiteboard, the server content component associated with the whiteboard can add a user identifier associated with the user to the whiteboard. In this example, when another user views the whiteboard, the client content component associated with the whiteboard receives the user identifier. This client content component uses the server user manager component 204 to retrieve the name of the user identified by the user identifier. In this way, the other user is able to see who added something to the whiteboard.

The server uploader component 208 allows users to upload files to be shared with other users participating in the teleconference. For example, a user participating in the teleconference may want to share a PDF document with other participants in the teleconference. In this example, a client communication component corresponding to the server uploader component 208 sends the PDF document to the server uploader component 208 via a connection between the client communication component and the server uploader component 208.

In other embodiments, other hierarchies of communication components include different communication components. For example, in some embodiments, a hierarchy of communication components includes a downloader component. The downloader component is a child component of the server root component 202. The downloader component facilitates the downloading of files to the client devices 104.

Figure 3:
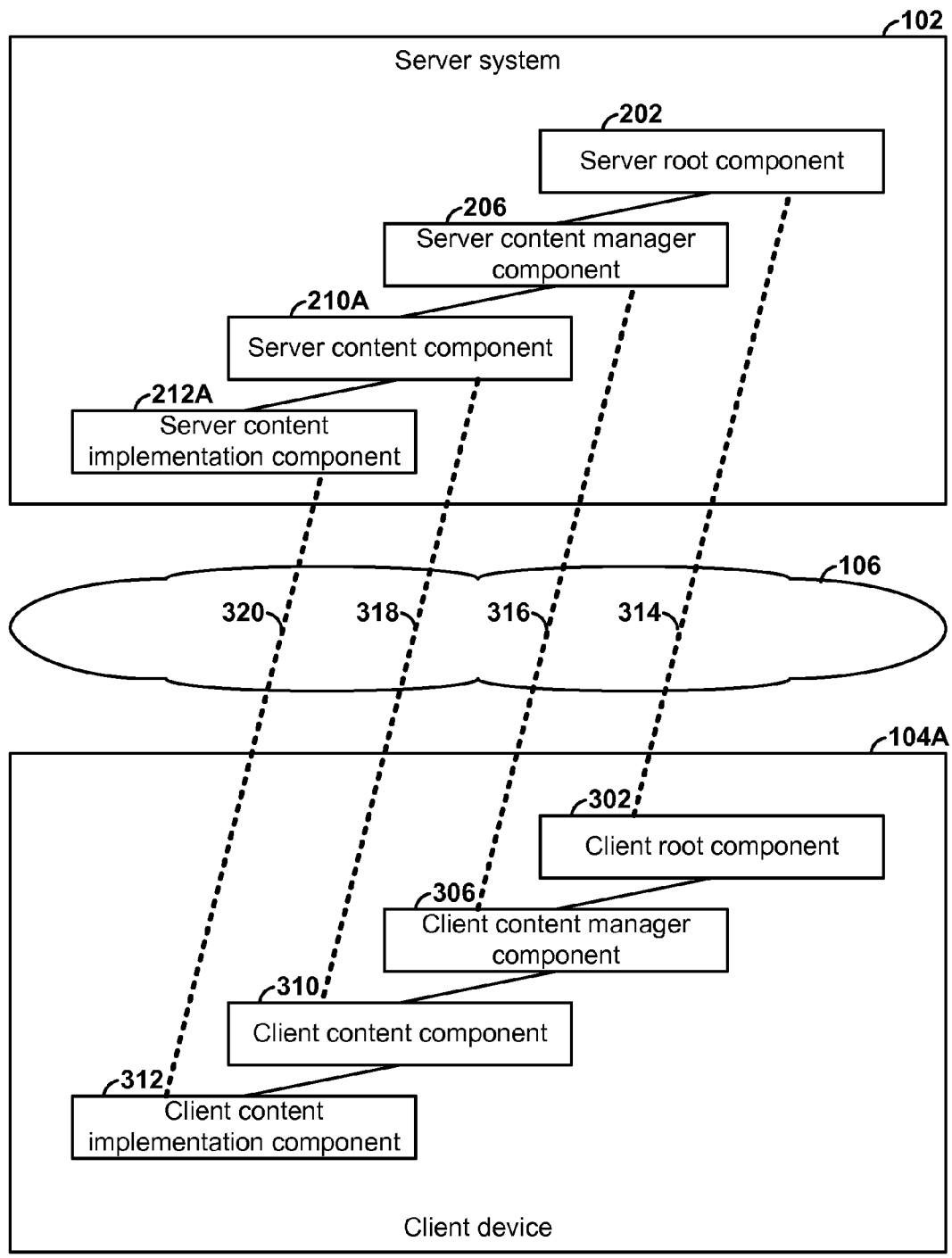
FIG. 3 is a block diagram illustrating connections between server communication components and corresponding client communication components.

FIG. 3 is a block diagram illustrating connections between server communication components and corresponding client communication components. The example of FIG. 3 is explained with reference to the client device 104A. However, the example of FIG. 3 can be equally applicable with regard to any other one of the client devices 104.

As illustrated in the example of FIG. 3, the server system 102 has instantiated the server root component 202, the server content manager component 206, the server content component 210A, and the server content implementation component 212A. In other examples, the server system 102 instantiates more or fewer server communication components.

Furthermore, as illustrated in the example of FIG. 3, the client device 104A has instantiated a client root component 302, a client content manager component 306, a client content component 310, and a client content implementation component 312. In other examples, the client device 104A instantiates more or fewer client communication components.

The client root component 302 corresponds to the server root component 202. The client content manager component 306 corresponds to the server content manager component 206. The client content component 310 corresponds to the server content component 210A. The client content implementation component 312 corresponds to the server content implementation component 212A.

The client root component 302 can establish a connection 314 to the server root component 202 via the network 106. The client content manager component 306 can establish a connection 316 to the server content manager component 206 via the network 106. The client content component 310 can establish a connection 318 to the server content component 210A via the network 106. The client content implementation component 312 can establish a connection 320 to the server content implementation component 212A via the network 106.

Figure 4:
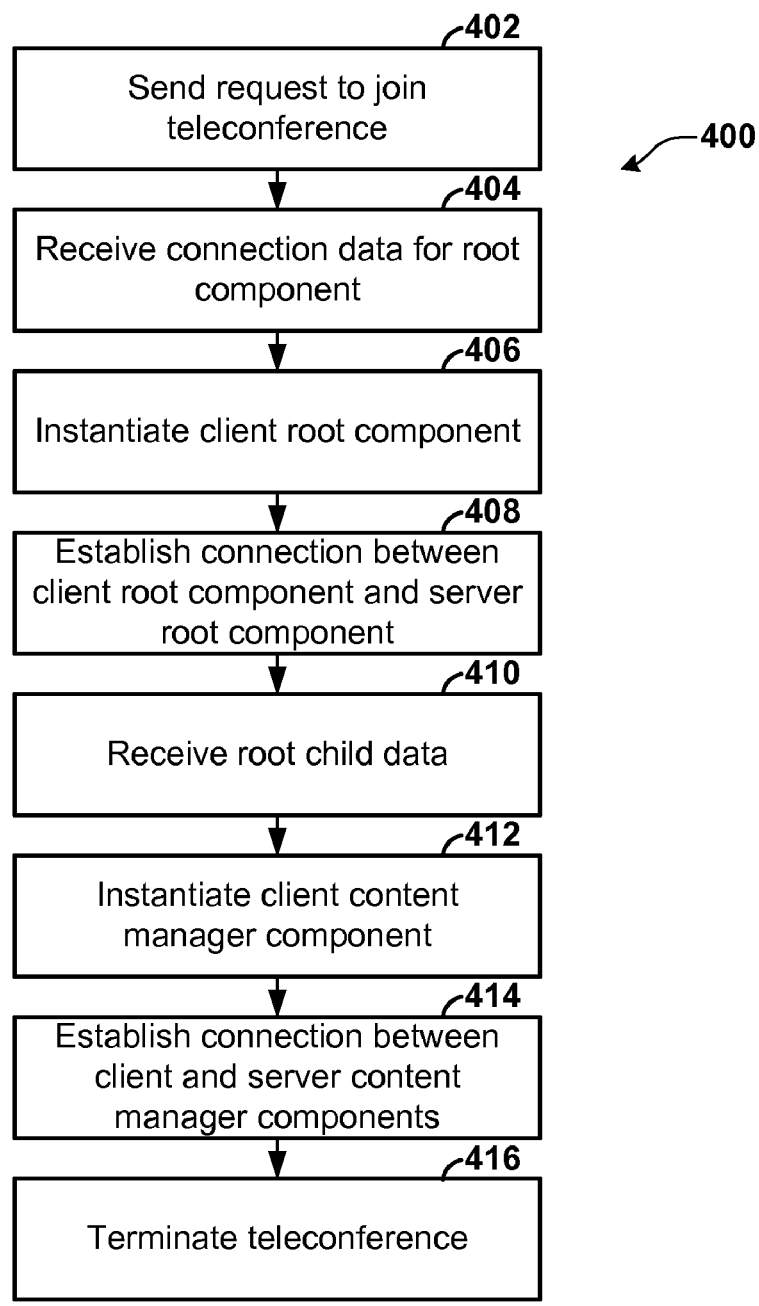
FIG. 4 is a flowchart illustrating an example operation performed by a client device.

FIG. 4 is a flowchart illustrating an example operation 400 performed by the client device 104A. Although the operation 400 is explained as being performed by the client device 104A, the operation 400 can be performed by any other one of the client devices 104.

The operation 400 starts when the client device 104A sends to the server system 102 a request to join a teleconference (402). The request to join the teleconference can be a request to start a new teleconference, a request to participate in an existing teleconference, or a response to an invitation from another user to participate in a teleconference.

After sending the request to join the teleconference, the client device 104A receives root connection data from the server system 102 (404). The root connection data specifies how the client device 104A is to set up a connection to the server root component 202. In response to receiving the root connection data, the client device 104A instantiates client root component (406). The client root component corresponds to the server root component. The client device 104A then establishes a first connection (408). The first connection is a connection between the server root component 202 and the client root component.

After the client device 104A establishes the first connection, the client root component receives root child data from the server root component 202 via the first connection (410). The root child data contains data identifies the child components of the server root component 202 (i.e., the server user manager component 204, the server content manager component 206, and the server uploader component 208). In response to receiving the root child data from the server root component 202, the client root component instantiates client communication components corresponding to the client communication components of the server root component 202 (412). In other words, the client root component instantiates a client user manager component, a client content manager component, and a client uploader component. The client root component then instructs the client user manager component, the client content manager component, and the client uploader component to establish connections with their corresponding server communication components (414).

Subsequently, the client root component terminates the teleconference (416). When the client root component terminates the teleconference, the client root component provides termination instructions to each child component of the client root component. The termination instructions are instructions to the child components to un-instantiate themselves. In various embodiments, the client root component can provide termination instructions to a child component in various ways. For example, in some embodiments, the client root component provides termination instructions to a child component by invoking a method of the child component. In another example, the client root component provides termination instructions to a child component by an inter-process message.

Figure 5:
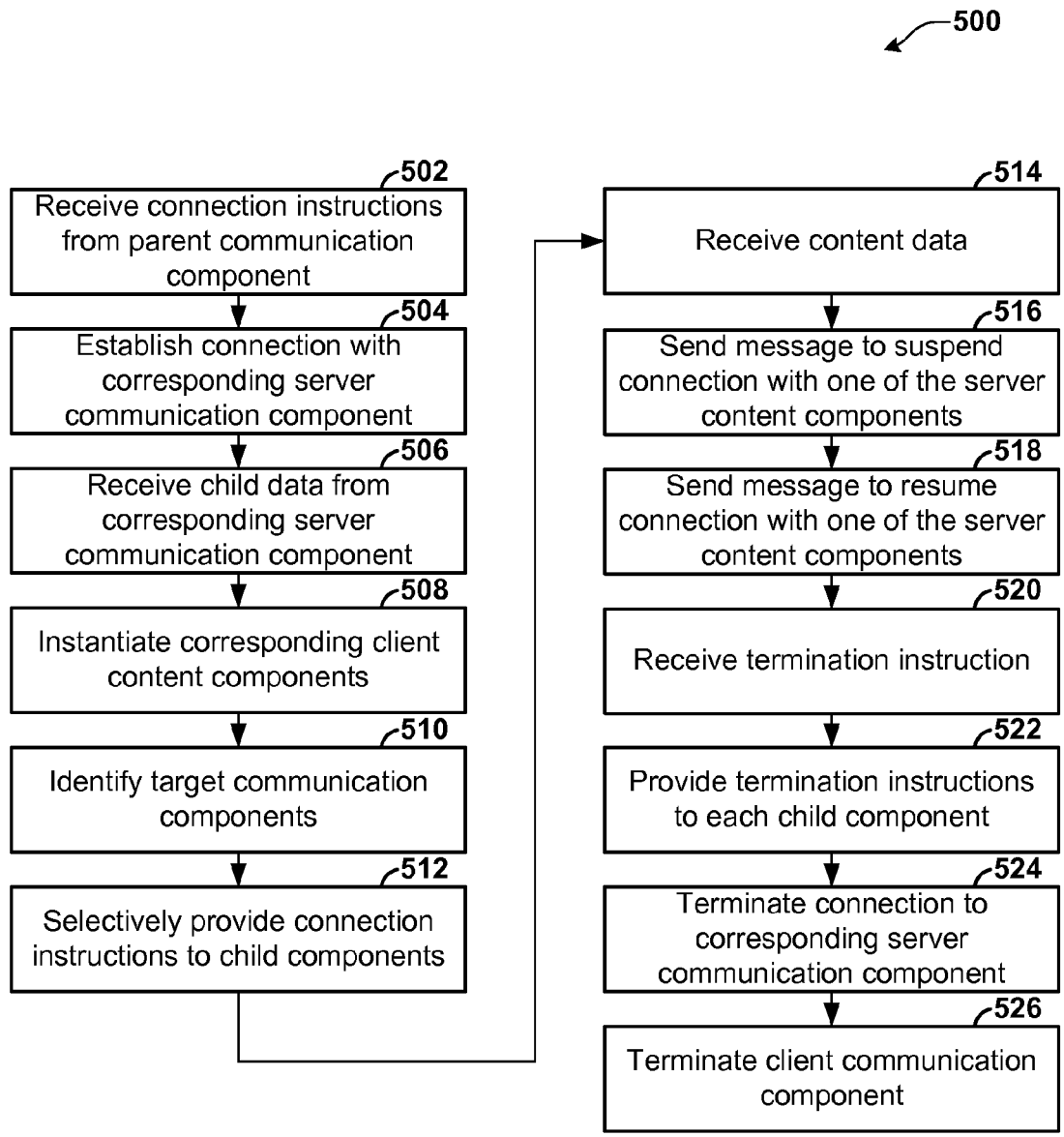
FIG. 5 is a flowchart illustrating an example operation performed by a client communication component at the client device.

FIG. 5 is a flowchart illustrating an example operation 500 performed by a client communication component at the client device 104A. The operation 500 can be performed by any client communication component other than the client root component. Although the operation 500 is explained with reference to the client device 104A, any other one of the client devices 104 can be substituted for the client device 104A in the discussion of the operation 500.

The operation 500 begins when the client communication component receives connection instructions from the client communication component's parent component (502). The connection instructions instruct the client communication component to establish a connection with a corresponding server communication component. In response to receiving the connection instructions, the client communication component establishes a connection with the corresponding server communication component (504).

In various embodiments, the client communication component can receive connection instructions in various ways. For example, in some embodiments, the client communication component receives the connection instructions when the parent component invokes a method of the client communication component. In another example, in some embodiments, the client communication component receives the connection instructions when the parent component invokes a shell command.

When the client communication component has established a connection to the corresponding server communication component, the client communication component receives child data from the server communication component via the connection (506). The child data identifies each child component of the server communication component and how to connect to each child component of the server communication component. For example, a client content manager component receives content manager child data that identifies child components of the server content manager component 206. If the server communication component does not have any child components, the client communication component does not receive the child data.

In response to receiving the child data from the server communication component, the client communication component instantiates client communication components corresponding to each child component of the server communication component (508). For example, where the client communication component corresponds to the server content manager component 206, the client communication component instantiates a client content component corresponding to the server content component 210A, a client content component corresponding to the server content component 210B, and a client content component corresponding to the server content component 210C. In another example, where the client communication component corresponds to the server content component 210A, the client communication component instantiates a client content implementation component corresponding to the server content implementation component 212A.

Next, the client communication component identifies target communication components from among the child components of the server communication component (510). The client communication component can identify target communication components in various ways.

For example, the client communication component can determine whether the client device 104A has a capability to support a content stream associated with a server content component. In this example, if the client device 104A does not have the capability to support the content stream associated with the server content component, the client communication component does not identify the server content component as a target communication component. For example, the client device 104A may not have a capability to support video streams. Hence, the client communication component does not identify a server communication component associated with a video stream as a target communication component.

In another example, the client communication component compares a version identifier of a child component to a version identifier of a corresponding server communication component. If the version identifiers indicate that the child component and the corresponding server communication component have compatible versions, the client content manager component identifies the corresponding server communication component as a target communication component.

In yet another example, the client communication component identifies target communication components based on one or more user properties. A user property is a property that provides information about a user. For instance, a given server communication component enables users to create poll questions. The client communication component can store a user property that indicates whether the user 108A is a presenter in the teleconference. If the user property indicates that the user 108A is a presenter, the client communication component can identify the given server communication component as a target communication component. If the user property indicates that the user 108A is not a presenter, the client communication component does not identify the given server communication component as a target communication component. In this way, only presenters connect to the given server communication component.

In yet another example, the client communication component identifies target communication components based on one or more conference properties. A conference property is a property that provides information about a teleconference. For instance, a conference property indicates a number of users that have established connections to a given server communication component. The client communication component does not identify the given server communication component as a target communication component when the number of users that have already established connections to the given server communication component exceeds a particular threshold. In another instance, a conference property indicates a set of content streams in the teleconference that are currently in focus. The client communication component exclusively identifies the server communication components associated with the set of content streams as target communication components. A content stream is in focus when a user involved in the teleconference indicates that other users involved in the teleconference should pay attention to the content stream.

In yet another example, the client communication component identifies target communication components based on user permissions. User permissions specify whether a user is permitted to access something. For instance, a user permission may indicate whether the user 108A has permission to access particular content streams. In this instance, the client communication component can identify a server communication component associated with a given content stream as a target communication component when the user 108A has permission to access the given content stream. The client communication component does not identify server communication components associated with the given content stream as target communication components when the user 108A does not have permission to access the given content stream.

In yet another example, the client communication component identifies target communication components based on user preferences or user actions. For example, the user 108A can set a user preference to indicate whether the client communication component is to identify a server communication component as a target communication component. In this example, the client communication component identifies the server communication component as a target communication component only when the user preference indicates to do so.

After identifying the target communication components, the client content manager component selectively provides connection instructions to the client content components corresponding to the target server content components (512). The connection instructions instruct the child components to establish connections with the target server content components. When the child components receive the connection instructions, the child components independently perform the operation 500. In this way, the client device 104A selectively establishes connections between the target communication components and corresponding client communication components.

Furthermore, after the client communication component establishes the connection with the corresponding server communication component, the client communication component receives data from the corresponding server communication component via the connection (514). The data sent by different types of server communication components conveys different information. For example, data sent by a whiteboard implementation component is content data representing the content of a whiteboard. In another example, data sent by a video implementation component convey is content data that represents a video stream. In yet another example, data sent by the server content manager component 206 can convey data about which content streams are currently in focus.

Subsequently, the client communication component can instruct one or more child components of the client communication component to suspend their connections with their corresponding server communication components (516). For example, if the client communication component corresponds to the server content manager component 206 and there is a connection between a child component of the client communication component and the server content component 210A, the client communication component can instruct the child component to suspend the connection with the server content component 210A.

The client communication component can instruct one of its child components to suspend the child component's connection with the child component's corresponding server communication component for a variety of reasons. For example, the client communication component can instruct one of its child components to suspend the child component's connection in response to instructions from the client communication component's parent component or the client communication component's corresponding server communication component. In another example, the client communication component can instruct one of its child components to suspend the child component's connection when the client communication component determines that a given amount of time has passed since the last time content data was sent on the child component's connection. In another example, the client communication component can instruct one of its child components to suspend the child component's connection when a content stream associated with the child component is not in focus.

Furthermore, after the client communication component instructs its child component to suspend the child component's connection with the child component's corresponding server communication component, the client communication component can instruct the child component to resume the connection with the child component's corresponding server communication component (518). The client communication component can instruct the child component to resume a connection with the child component's corresponding server communication component for a variety of reasons. For example, the client communication component can instruct the child component to resume a connection in response to instructions received by the client communication component from the server communication component corresponding to the client communication component. In another example, the client communication component can instruct the child component to resume the connection when the client communication component determines that the client device 104A has sufficient bandwidth to provide a satisfactory quality of service if the connection were active. In yet another example, the client communication component can instruct the child component to resume the connection when the child component is associated with a content stream that is now in focus.

Subsequently, the client communication component receives termination instructions from the parent component of the client communication component (520). The client communication component receives termination instructions when the teleconference ends or when the user of the client device 104A leaves the teleconference. In response to the termination instructions, the client communication component provides termination instructions to each child component of the client communication component (522). If the connection has not already been suspended, the client communication component then terminates the connection with the corresponding server communication component (524). The client communication component then terminates (526).

Figure 6A:
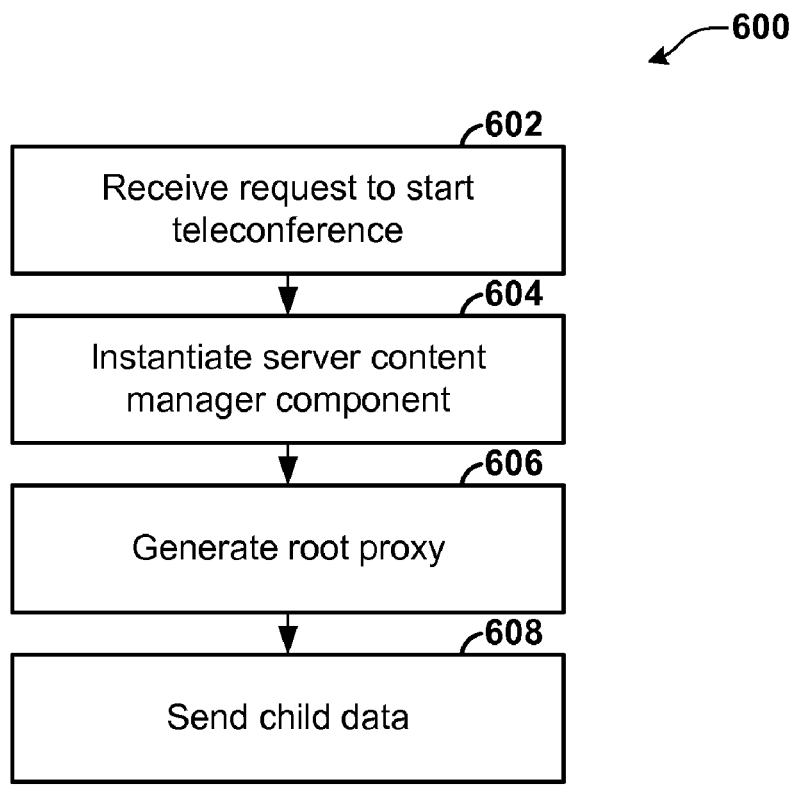
FIG. 6A is a flowchart illustrating an example operation performed by a server root component of the server system when the server root component receives a request to start a teleconference.

FIG. 6A is a flowchart illustrating an example operation 600 performed by the server root component 202 of the server system 102 when the server root component 202 receives a request to start a teleconference. Although the operation 600 is explained with reference to the client device 104A, any other one of the client devices 104 can be substituted for the client device 104A in the discussion of the operation 600.

As illustrated in the example of FIG. 6A, the operation 600 begins when the server root component 202 receives a request to start a new teleconference from the client device 104A (602). In response to the request to start the new teleconference, the server root component 202 instantiates the server content manager component 206 (604). In various embodiments, the server root component 202 instantiates the server content manager component 206 in various ways. For example, in some embodiments, the server root component 202 instantiates the server content manager component 206 by invoking a method of a factory object or by invoking a constructor method of a class. In addition to instantiating the server content manager component 206, the server root component 202 can instantiate the server user manager component 204, the server uploader component 208, and/or other components. However, for the sake of simplicity, these steps are omitted from the operation 600.

After instantiating the server content manager component 206, the server root component 202 generates a root proxy for the client device 102A (606). The root proxy is a software object that handles communication between the server root component 202 and a corresponding client root component at the client device 102A.

After the server root component 202 generates the root proxy for the client device 102A, the server root component 202 uses the root proxy for the client device 102A to send root child data to the corresponding client root component (608). The root child data identifies the child components of the server root component 202 and indicates how to establish connections to the child components of the server root component 202.

Figure 6B:
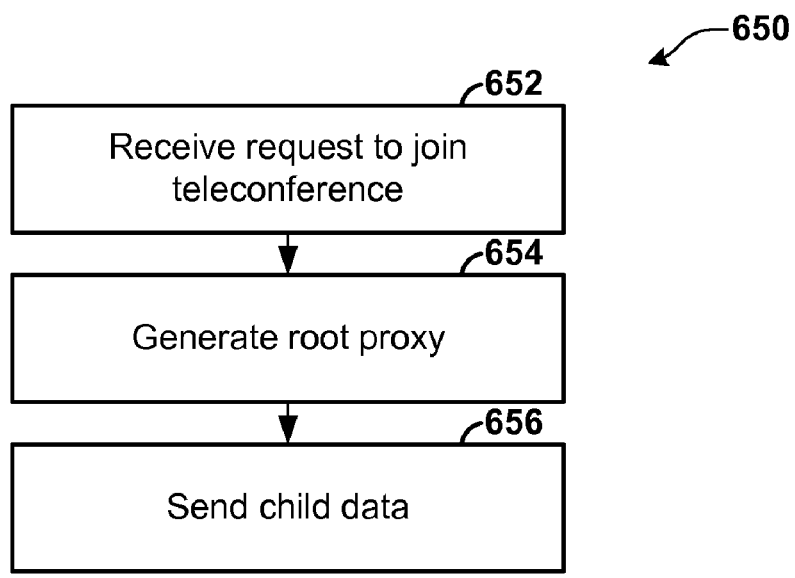
FIG. 6B is a flowchart illustrating an example operation performed by the server root component of the server system when the server root component receives a request to join an existing teleconference.

FIG. 6B is a flowchart illustrating an example operation 650 performed by the server root component 202 of the server system 102 when the server root component 202 receives a request to join an existing teleconference. Although the operation 650 is explained with reference to the client device 104B, any other one of the client devices 104 can be substituted for the client device 104B in the discussion of the operation 650.

As illustrated in the example of FIG. 6B, the operation 650 begins when the server root component 202 receives a request from the client device 104B to join an existing teleconference (652). In response to receiving the request, the server root component 202 generates a root proxy for the client device 104B (654). The root proxy for the client device 104B is a software object that handles communications between the server root component 202 and a corresponding client root component at the client device 104B.

After the server root component 202 generates the root proxy for the client device 104B, the server root component 202 uses the root proxy for the client device 104B to send root child data to the client root component at the client device 104B (656). The root child data identifies each of the child components of the server root component 202 and indicates how to establish connections to the child components of the server root component 202.

The server root component 202 performs the operation 650 each time the server root component 202 receives a request to join the teleconference. In this way, the server root component 202 can generate a plurality of root proxies, one for each client device involved in the teleconference.

Figure 7A:
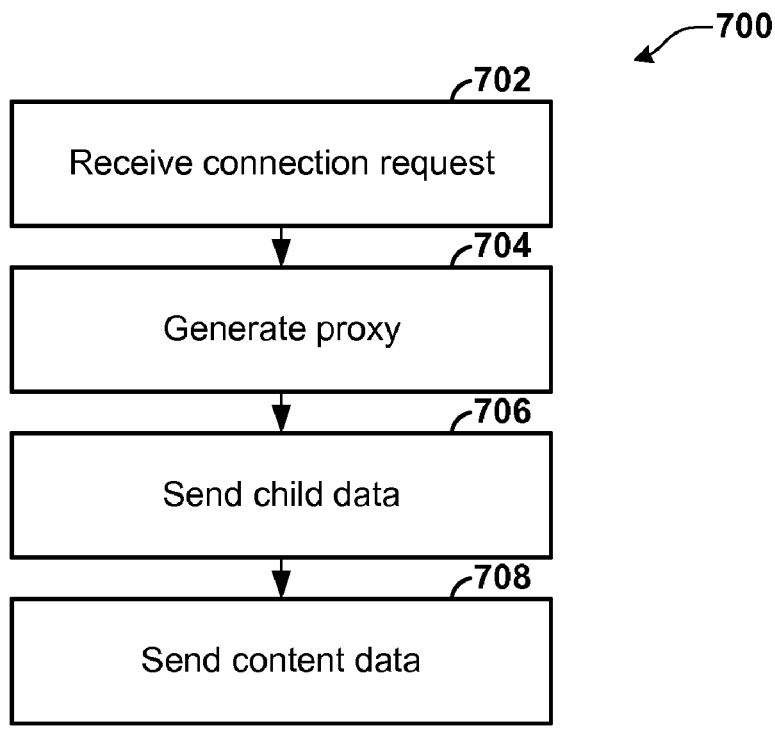
FIG. 7A is a flowchart illustrating an example operation performed by a server communication component in response to a request to establish a connection between a client communication component and the server communication component.

FIG. 7A is a flowchart illustrating an example operation 700 performed by a server communication component in response to a request to establish a connection between a client communication component and the server communication component. In some embodiments, any server communication component can perform the operation 700. Although the operation 700 is explained with reference to the client device 104A, any other one of the client devices 104 can be substituted for the client device 104A in the discussion of the operation 700.

As illustrated in the example of FIG. 7A, the operation 700 begins when the server communication component receives a connection request from a client communication component at the client device 104A (702). The connection request is a request to establish a connection with the server communication component. In response to receiving the connection request, the server communication component generates a proxy for the client device 104A (704). The proxy for the client device 104A is a software object that handles communications between the server communication component and the corresponding client communication component at the client device 104A.

If the server communication component has one or more child components, the server communication component uses the proxy for the client device 104A to send child data to the corresponding client communication component at the client device 104A (706). The child data identifies each child component of the server communication component and indicates how to connect to the child components of the server communication component. The server communication component then uses the proxy for the client device 104A to send content data to the corresponding client component at the client device 104A (708).

Figure 7B:
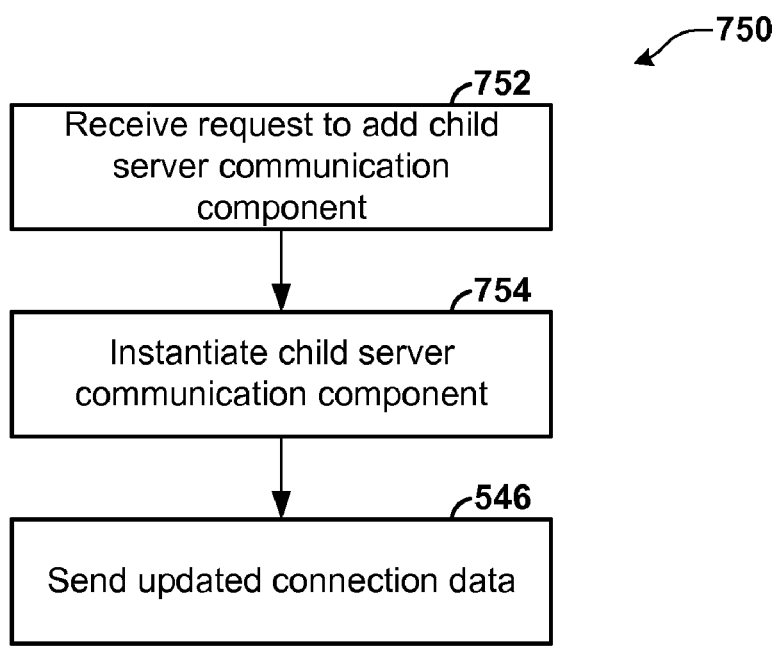
FIG. 7B is a flowchart illustrating an example operation performed by a server communication component in response to a request to add a child component to the server communication component.

FIG. 7B is a flowchart illustrating an example operation 750 performed by a server communication component in response to a request to add a child component to the server communication component. In some embodiments, any server communication component can perform the operation 750. Although the operation 750 is explained with reference to the client device 104A, any other one of the client devices 104 can be substituted for the client device 104A in the discussion of the operation 750.

As illustrated in the example of FIG. 7B, the operation 750 begins when the server communication component receives a request from the client device 104A to add a child component to the server communication component (752). The client device 104A can sent a request to add a child component to the server communication component for a variety of reasons. For example, the user 108A may want to add an additional whiteboard to a teleconference. In this example, the client device 104A can send a request to the server content manager component 206 to add a whiteboard component as a child component of the server content manager component 206.

In response to the request to add a child component, the server communication component instantiates a new child component (754). The server communication component then uses the server communication component's proxies to send updated child data to client devices 104 that have established connections to the server communication component (756). The updated child data identifies the new child component and indicates how to connect to the new child component.

Figure 8:
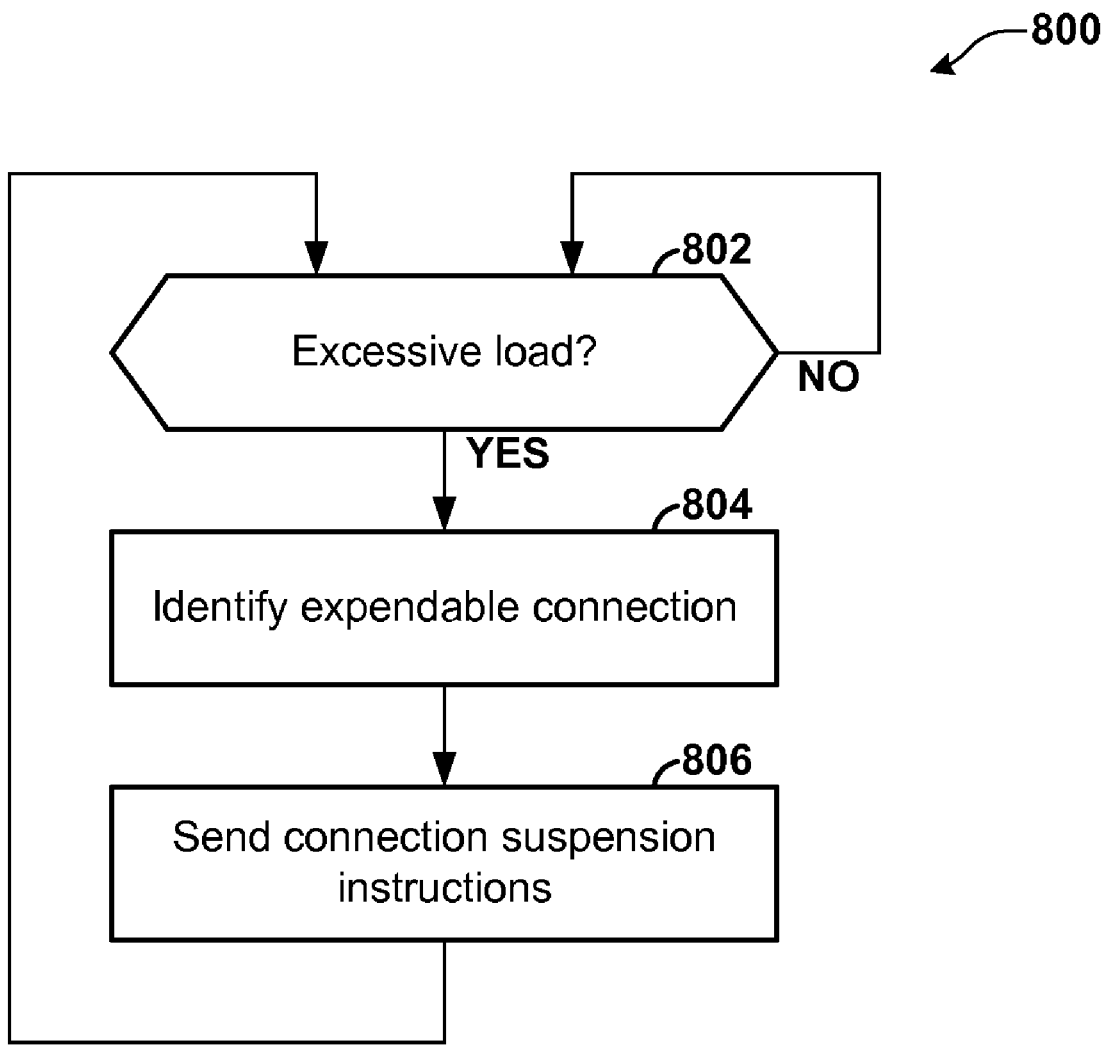
FIG. 8 is a flowchart illustrating an example operation performed by a server content manager component to manage an amount of data transferred by the server system.

FIG. 8 is a flowchart illustrating an example operation 800 performed by the server content manager component 206 to manage an amount of data transferred by the server system 102.

As illustrated in the example of FIG. 8, the server content manager component 206 determines whether the server system 102 is experiencing excessive load (802). The server system 102 experiences excessive load when the server system 102 is unable to maintain a quality of service expected by client devices that are receiving data from the server system 102. For example, when the client devices expect to receive video data at a certain bit rate, but the server system 102 is unable to consistently provide the video data to the client devices at that bit rate due to the volume of data being processed and/or transmitted, the server system 102 is experiencing excessive load. Furthermore, in some embodiments, the server content manager component 206 proactively determines whether the server system 102 is likely to experience excessive load in the future. For example, in some embodiments, the server content manager component 206 proactively determines whether the server system 102 is likely to experience excessive load in the next five minutes.

If the server content manager component 206 determines that the server system 102 is not experiencing excessive load ("NO" of 802), the server content manager component 206 loops back and can subsequently re-determine whether the server system 102 is experiencing excessive load (802).

On the other hand, if the server content manager component 206 determines that the server system 102 is experiencing excessive load ("YES" of 802), the server content manager component 206 identifies an expendable connection (804). The expendable connection is an active (i.e., not suspended) connection that is least likely to significantly disrupt a user's participation in a teleconference if the connection is suspended. In various embodiments, the server content manager component 206 can use various heuristics to identify the expendable connection. For example, in some embodiments, the server content manager component 206 can identify an expendable connection based on an amount of time since content data was last sent on the connection. In another example, the server content manager component 206 can identify an expendable connection based on whether a content stream associated with the connection is currently in focus.

After identifying the expendable connection, the server content manager component 206 sends connection suspension instructions to the client content manager component associated with the expendable connection (806). The connection suspension instructions instruct the client connect manager component to instruct a client communication component associated with the expendable connection to suspend the expendable component.

It should be appreciated that the server content manager component 206 can perform other operations to address excessive load aside from the operation 800. For example, in some embodiments, when the server content manager component 206 detects excessive load, the server content manager component 206 sends connection suspension instructions to client content manager components. These connection suspension instructions instruct each of the client content manager components to independently identify expendable connections at the client devices 104. In another example, when the server content manager component 206 detects excessive load, the server content manager component 206 instructs one or more of its child components to identify and suspend expendable connections.

Figure 9:
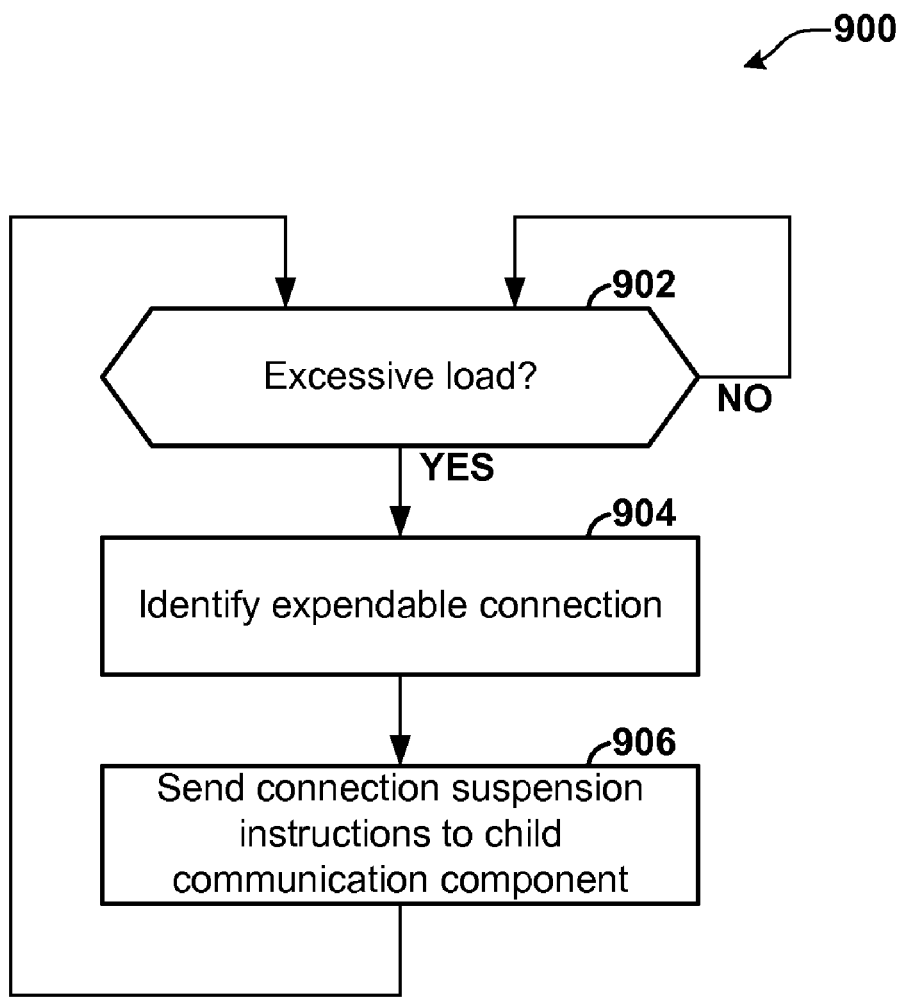
FIG. 9 is a flowchart illustrating an example operation performed by a client content manager component to manage an amount of data received by the client device.

FIG. 9 is a flowchart illustrating an example operation 900 performed by a client content manager component to manage an amount of data received by the client device 104A. Although the operation is explained with regard to the client device 104A, it should be appreciated that client content manager components at any of the client devices 104 can perform the operation 900.

As illustrated in the example of FIG. 9, the client content manager component of the client device 104A determines whether the client device 104A is experiencing excessive load (902). The client device 104A experiences excessive load when the client device 104A is unable to maintain a quality of service expected by the user 108A. For example, when the user 108A expects to receive audio data having a certain quality level, but the client device 104A is unable to consistently receive and/or process the audio data at the quality level due to the volume of data being received and/or processed by the client device 104A, the client device 104A is experiencing excessive load. Furthermore, in some embodiments, the client content manager component proactively determines whether the client device 104A is likely to experience excessive load in the future. For example, in some embodiments, the client content manager component proactively determines whether the client device 104A is likely to experience excessive load in the next four minutes.

If the client content manager component determines that the client device 104A is not experiencing excessive load ("NO" of 902), the client content manager component loops back and can subsequently re-determine whether the client device 104A is experiencing excessive load or likely to experience excessive load (902).

On the other hand, if the client content manager component determines that the client device 104A is experiencing excessive load ("YES" of 902), the client content manager component 206 identifies an expendable connection (904). The expendable connection is an active (i.e., not suspended) connection that is least likely to significantly disrupt a user's participation in a teleconference if the connection is suspended. In various embodiments, the client content manager component can use various heuristics to identify the expendable connection. For example, in some embodiments, the client content manager component can identify an expendable connection based on an amount of time since content data was last received on the connection. In another example, the client content manager component can identify an expendable connection based on whether a content stream associated with the connection is currently in focus. In yet another example, the client content manager component can identify an expendable connection based on whether the client device 104A has a physical or software capability to support a content stream (e.g., a video camera, an audio codec, etc.).

After identifying the expendable connection, the client content manager component sends connection suspension instructions to a given child component of the client content manager component (906). The given child component is associated with the expendable connection. The connection suspension instructions instruct the given child component to suspend the expendable component. In some circumstances, the expendable connection can be between a server communication component and a child, grandchild, etc. of the given child component. In such circumstances, the given child component instructs a child component of the given child component to suspend the expendable component, and so on.

It should be appreciated that the client content manager component can perform other operations to address excessive load aside from the operation 900. For example, in some embodiments, when the client content manager component detects excessive load, the client content manager component sends connection suspension instructions to the server content manager component 206. These connection suspension instructions instruct the server content manager component 206 to identify expendable connections with the client device 104A. In another example, when the client content manager component detects excessive load, the client content manager component instructs one or more of its child components to identify and suspend expendable connections.

Figure 10:
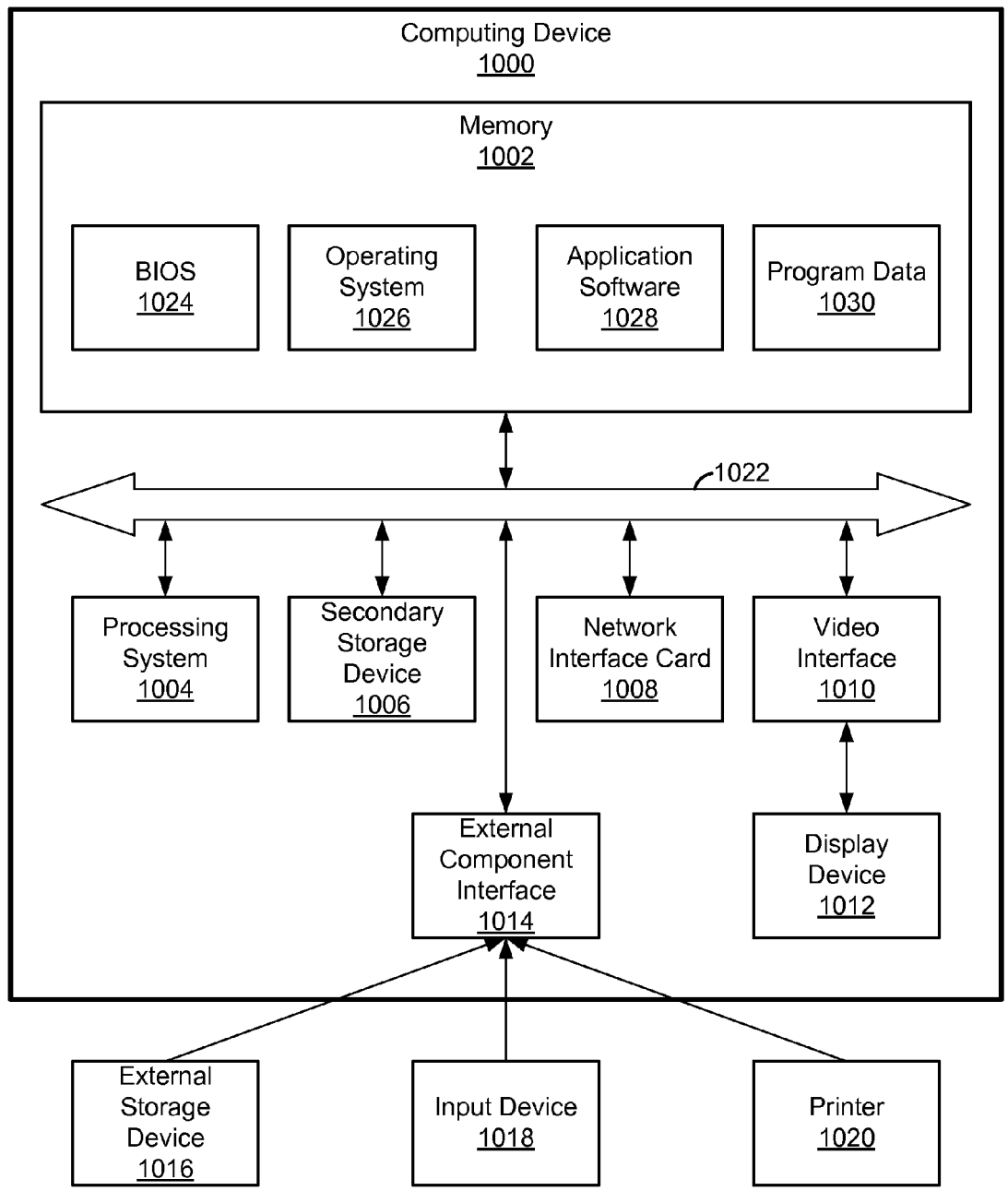
FIG. 10 is a block diagram illustrating an example computing device usable in the communication system.

FIG. 10 is a block diagram illustrating an example computing device 1000 usable in the communication system 100. In some embodiments, the server system 102 and the client devices 104 are implemented using one or more computing devices like the computing device 1000. It should be appreciated that in other embodiments, the server system 102 and the client devices 104 are implemented using computing devices having hardware components other than those illustrated in the example of FIG. 10.

In different embodiments, computing devices are implemented in different ways. For instance, in the example of FIG. 10, the computing device 1000 comprises a memory 1002, a processing system 1004, a secondary storage device 1006, a network interface card 1008, a video interface 1010, a display device 1012, an external component interface 1014, an external storage device 1016, an input device 1018, a printer 1020, and a communication medium 1022. In other embodiments, computing devices are implemented using more or fewer hardware components. For instance, in another example embodiment, a computing device does not include a video interface, a display device, an external storage device, or an input device.

The memory 1002 includes one or more computer-readable data storage media capable of storing data and/or instructions. In different embodiments, the memory 1002 is implemented in different ways. For instance, in various embodiments, the memory 1002 is implemented using various types of computer-readable data storage media. Example types of computer-readable data storage media include, but are not limited to, dynamic random access memory (DRAM), double data rate synchronous dynamic random access memory (DDR SDRAM), reduced latency DRAM, DDR2 SDRAM, DDR3 SDRAM, Rambus RAM, solid state memory, flash memory, read-only memory (ROM), electrically-erasable programmable ROM, and other types of devices and/or articles of manufacture that store data.

The processing system 1004 includes one or more physical integrated circuits that selectively execute software instructions. In various embodiments, the processing system 1004 is implemented in various ways. For instance, in one example embodiment, the processing system 1004 is implemented as one or more processing cores. For instance, in this example embodiment, the processing system 1004 may be implemented as one or more Intel Core 2 microprocessors. In another example embodiment, the processing system 1004 is implemented as one or more separate microprocessors. In yet another example embodiment, the processing system 1004 is implemented as an ASIC that provides specific functionality. In yet another example embodiment, the processing system 1004 provides specific functionality by using an ASIC and by executing software instructions.

In different embodiments, the processing system 1004 executes software instructions in different instruction sets. For instance, in various embodiments, the processing system 1004 executes software instructions in instruction sets such as the x86 instruction set, the POWER instruction set, a RISC instruction set, the SPARC instruction set, the IA-64 instruction set, the MIPS instruction set, and/or other instruction sets.

The secondary storage device 1006 includes one or more computer-readable data storage media. The secondary storage device 1006 stores data and software instructions not directly accessible by the processing system 1004. In other words, the processing system 1004 performs an I/O operation to retrieve data and/or software instructions from the secondary storage device 1006. In various embodiments, the secondary storage device 1006 is implemented by various types of computer-readable data storage media. For instance, the secondary storage device 1006 may be implemented by one or more magnetic disks, magnetic tape drives, CD-ROM discs, DVD-ROM discs, Blu-Ray discs, solid state memory devices, Bernoulli cartridges, and/or other types of computer-readable data storage media.

The network interface card 1008 enables the computing device 1000 to send data to and receive data from a computer communication network. In different embodiments, the network interface card 1008 is implemented in different ways. For example, in various embodiments, the network interface card 1008 is implemented as an Ethernet interface, a token-ring network interface, a fiber optic network interface, a wireless network interface (e.g., WiFi, WiMax, etc.), or another type of network interface.

The video interface 1010 enables the computing device 1000 to output video information to the display device 1012. In different embodiments, the video interface 1010 is implemented in different ways. For instance, in one example embodiment, the video interface 1010 is integrated into a motherboard of the computing device 1000. In another example embodiment, the video interface 1010 is a video expansion card. Example types of video expansion cards include Radeon graphics cards manufactured by ATI Technologies, Inc. of Markham, Ontario, Geforce graphics cards manufactured by Nvidia Corporation of Santa Clara, Calif., and other types of graphics cards.

In various embodiments, the display device 1012 is implemented as various types of display devices. Example types of display devices include, but are not limited to, cathode-ray tube displays, LCD display panels, plasma screen display panels, touch-sensitive display panels, LED screens, projectors, and other types of display devices. In various embodiments, the video interface 1010 communicates with the display device 1012 in various ways. For instance, in various embodiments, the video interface 1010 communicates with the display device 1012 via a Universal Serial Bus (USB) connector, a VGA connector, a digital visual interface (DVI) connector, an S-Video connector, a High-Definition Multimedia Interface (HDMI) interface, a DisplayPort connector, or other types of connectors.

The external component interface 1014 enables the computing device 1000 to communicate with external devices. In various embodiments, the external component interface 1014 is implemented in different ways. For instance, in one example embodiment, the external component interface 1014 is a USB interface. In other example embodiments, the computing device 1000 is a FireWire interface, a serial port interface, a parallel port interface, a PS/2 interface, and/or another type of interface that enables the computing device 1000 to communicate with external components.

In different embodiments, the external component interface 1014 enables the computing device 1000 to communicate with different external components. For instance, in the example of FIG. 10, the external component interface 1014 enables the computing device 1000 to communicate with the external storage device 1016, the input device 1018, and the printer 1020. In other embodiments, the external component interface 1014 enables the computing device 1000 to communicate with more or fewer external components. Other example types of external components include, but are not limited to, speakers, phone charging jacks, modems, media player docks, other computing devices, scanners, digital cameras, a fingerprint reader, and other devices that can be connected to the computing device 1000.

The external storage device 1016 is an external component comprising one or more computer readable data storage media. Different implementations of the computing device 1000 interface with different types of external storage devices. Example types of external storage devices include, but are not limited to, magnetic tape drives, flash memory modules, magnetic disk drives, optical disc drives, flash memory units, zip disk drives, optical jukeboxes, and other types of devices comprising one or more computer-readable data storage media. The input device 1018 is an external component that provides user input to the computing device 1000. Different implementations of the computing device 1000 interface with different types of input devices. Example types of input devices include, but are not limited to, keyboards, mice, trackballs, stylus input devices, key pads, microphones, joysticks, touch-sensitive display screens, and other types of devices that provide user input to the computing device 1000. The printer 1020 is an external device that prints data to paper. Different implementations of the computing device 1000 interface with different types of printers. Example types of printers include, but are not limited to laser printers, ink jet printers, photo printers, copy machines, fax machines, receipt printers, dot matrix printers, or other types of devices that print data to paper.

The communications medium 1022 facilitates communication among the hardware components of the computing device 1000. In different embodiments, the communications medium 1022 facilitates communication among different components of the computing device 1000. For instance, in the example of FIG. 10, the communications medium 1022 facilitates communication among the memory 1002, the processing system 1004, the secondary storage device 1006, the network interface card 1008, the video interface 1010, and the external component interface 1014. In different implementations of the computing device 1000, the communications medium 1022 is implemented in different ways. For instance, in different implementations of the computing device 1000, the communications medium 1022 may be implemented as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 1002 stores various types of data and/or software instructions. For instance, in the example of FIG. 10, the memory 1002 stores a Basic Input/Output System (BIOS) 1024, an operating system 1026, application software 1028, and program data 1030. The BIOS 1024 includes a set of software instructions that, when executed by the processing system 1004, cause the computing device 1000 to boot up. The operating system 1026 includes a set of software instructions that, when executed by the processing system 1004, cause the computing device 1000 to provide an operating system that coordinates the activities and sharing of resources of the computing device 1000. Example types of operating systems include, but are not limited to, Microsoft Windows®, Linux, Unix, Apple OS X, Apple OS X iPhone, Palm webOS, Palm OS, Google Chrome OS, Google Android OS, and so on. The application software 1028 includes a set of software instructions that, when executed by the processing system 1004, cause the computing device 1000 to provide applications to a user of the computing device 1000. The program data 1030 is data generated and/or used by the application software 1028.

The various embodiments described above are provided by way of illustration only and should not be construed as limiting. Those skilled in the art will readily recognize various modifications and changes that may be made without following the example embodiments and applications illustrated and described herein. Furthermore, it should be appreciated that use of the terms "first," "second," "third," etc. in the follow claims should not necessarily be taken to imply a sequence. Rather, the terms "first," "second," "third," etc. are merely used as labels for different elements.

We claim:

1. A method comprising:
  instantiating, by a client device, a plurality of client communication components, each client content component in the plurality of client communication components corresponding to one server content component in a plurality of server communication components at a server system;
  selectively establishing connections between target server communication components in the plurality of server communication components and corresponding client communication components in the plurality of client communication components;
  receiving, by the client device, data from the target communication components via the connections, wherein the data from different ones of the target communication components is associated with a different content stream of a teleconference;
  instantiating, by the client device, a client content manager component;
  establishing, by the client device, a connection between the client content manager component and a server content manager component at the server system;
  receiving, by the client device, content manager child data via the connection between the client content manager component and the server content manager component, the child data identifying each server communication component in the plurality of server communication components;
  sending, by the client device, a request to join the teleconference;
  receiving, by the client device, root connection data that specifies how the client device is to set up a connection to a server root component at the server system;
  instantiating a client root component;
  establishing a connection between the client root component and the server root component;
  receiving, by the client device, root child data from the server root component via the connection between the client root component and the server root component, the root child data identifying the client content manager component; and
  during the teleconference, suspending a given connection by the client device in response to instructions received by the client manager component from the server content manager component, the given connection being the connection between a given client communication component in the plurality of client communication components and a given server communication component in the plurality of server communication components, the given server communication component corresponding to the given client communication component, the client device continuing to receive data via the connections other than the given connection,
  wherein the client device instantiates the client content manager component in response to receiving the root child data from the server root component.

2. The method of claim 1, further comprising: during the teleconference, resuming the given connection.

3. The method of claim 1, further comprising: processing the data received via the given connection to present one of the following types of content streams: slideshow presentations, real time audio communication streams, whiteboards, text chat, polls and surveys, screen sharing, desktop sharing, and application sharing.

4. The method of claim 1, wherein selectively establishing connections comprises: establishing a connection between the given client communication component and the given server communication component when the client device has a capability to support a content stream associated with the given server communication component.

5. The method of claim 1, wherein selectively establishing connections comprises: establishing a connection between the given client communication component and the given server communication component when a version identifier of the given client communication component and a version identifier of the given server communication component indicate that the given client communication component and the given server communication component have compatible versions.

6. The method of claim 1, wherein selectively establishing connections comprises: establishing a connection between the given client communication component and the given server communication component when a user of the client device has permission to access a content stream associated with the given server communication component.

7. The method of claim 1, wherein the given connection is suspended when a given amount of time has passed since a last time data was sent on the given connection.

8. The method of claim 1, wherein the given connection is suspended when a content stream associated with the given client communication component is not in focus.

9. The method of claim 1, wherein the given connection is suspended in response to connection suspension instructions received from the server system.

10. The method of claim 1,
  wherein receiving the data from the target communication components comprises: receiving, by the client device, data from the given server communication component, wherein the data from the given server communication component represents metadata regarding a given content stream of the teleconference;
  wherein the method further comprises:
    after establishing the given connection, receiving child data from the given server communication component via the given connection, the child data identifying a server content implementation component and indicating how to connect to the server content implementation component;
    instantiating a client content implementation component that corresponds to the server content implementation component;
    determining whether the server content implementation component is a target communication component;
    establishing a connection between the client content implementation component and the server content implementation component when it is determined that the server content implementation component is a target communication component; and
    receiving, by the client device, data from the server content implementation component via the connection between the client content implementation component and the server content implementation component, wherein the data received from the server content implementation component represents contents of the given content stream.

11. A server system comprising:
  a processing system; and a data storage system that stores instructions that, when executed by the processing system, cause the server system to:
  instantiate a hierarchy of server communication components, the hierarchy of server communication components including at least a first server content component and a second server content component;
  establish a first connection, the first connection being between the first server content component and a first client content component on a client device;
  establish a second connection, the second connection being between the second server content component and a second client content component on the client device;
  send data associated with a first content stream of a teleconference to the first client content component via the first connection;
  send data associated with a second content stream of the teleconference to the second client content component via the second connection; and
  during the teleconference, suspend the first connection without suspending the second connection,
  wherein the hierarchy of server communication components further comprises a server root component and a server content manager component, the server content manager component being a child component of the server root component, the first server content component and the second server content component being child components of the server content manager component; and
  wherein the instructions, when executed by the processing system, cause the server system to:
    establish a third connection, the third connection being between the server root component and a corresponding client root component on the client device in response to a request from the client device to be involved in the teleconference;
    send root child data to the client device via the third connection, the root child data identifying the server content manager component;
    establish a fourth connection, the fourth connection being between the server content manager component and a client content manager component on the client device; and
    send content manager child data to the client device via the fourth connection, the content manager child data identifying the first server content component and the second server content component.

12. The server system of claim 11, wherein during the teleconference the instructions, when executed by the processing system, further cause the server system to:
  instantiate a new child component in response to receiving a request to add the new child component, the new child component being a child of a given server communication component in the hierarchy of server communication components; and
  send updated child data to client devices that have established connections to the given server communication component, the updated child data identifying the new child component and indicating how to connect to the new child component.

13. The server system of claim 11, wherein the instructions, when executed by the processing system, further cause the server system to:
  determine whether the server system is experiencing excessive load;
  in response to determining that the server system is experiencing excessive load, identify expendable connections; and
  when the first connection is an expendable connection, send connection suspension instructions to the client content manager component via the fourth connection, the connection suspension instructions instructing the client content manager component to suspend the first connection.

14. The server system of claim 13, wherein the server system identifies the first connection as an expendable connection based on an amount of time since data was last sent on the first connection.

15. The server system of claim 11,
  wherein the hierarchy of server communication components includes a server content implementation component, the server content implementation component being a child component of the first server content component;
  wherein the instructions, when executed by the processing system, further cause the server system to:
    establish a fifth connection, the fifth connection being between the server content implementation component and a client content implementation component on the client device; and
    send data associated with the first content stream to the client content implementation component via the fifth connection;
  wherein the data sent via the first connection represents metadata regarding the first content stream and the data sent via the fifth connection represents substantive content in the first content stream.

16. The server system of claim 15, wherein the first content stream belongs to one of the following types of content streams: slideshow presentations, real time audio communication streams, whiteboards, text chat, polls and surveys, screen sharing, desktop sharing, and application sharing.

17. A computer-readable data storage medium comprising instructions that, when executed by a processing system of a client device, cause the client device to:
  send a request to a server system to be involved in a teleconference having a plurality of content streams, each content stream in the plurality of the content streams belonging to one of the following types of content streams: slideshow presentations, real time audio communication streams, whiteboards, text chat, polls and surveys, screen sharing, desktop sharing, and application sharing;
  receive root child data from the server system via a first connection, the first connection being established between a server root component and a corresponding client root component on the client device in response to the request, the root child data identifying a server content manager component at the server system;
  instantiate, in response to receiving the root child data, a client content manager component;
  establish a second connection, the second connection being between the client content manager component and the server content manager component;
  receive content manager child data via the second connection, the content manager child data identifying a hierarchy of server communication components, the hierarchy of server communication components including a plurality of server content components, each server communication component in the hierarchy of server communication components being a child of the server content manager component;

instantiate a hierarchy of client communication components, the hierarchy of client communication components including a plurality of client content components, the client content components being child components of the client content manager component, each of the client content components corresponding to one of the server content components;

identify target communication components from among the hierarchy of server communication components;

selectively establish additional connections, the additional connections being between the target communication components and corresponding client content components in the hierarchy of client communication components;

receive data from the target communication components via the additional connections, wherein the data received via different ones of the additional connections is associated with a different ones of the content streams; and process the data received via the additional connections to present the content streams;

during the teleconference, suspend a given connection, the given connection being one of the additional connections, the client device continuing to receive data via the additional connections other than the given connection;

during the teleconference, resume the given connection; and after resuming the given connection, terminate the teleconference.

* * * * *